US007433320B2

(12) United States Patent
Previdi et al.

(10) Patent No.: US 7,433,320 B2
(45) Date of Patent: Oct. 7, 2008

(54) SYSTEM AND METHODS FOR NETWORK PATH DETECTION

(75) Inventors: Stefano Previdi, Rome (IT); James N. Guichard, Groton, MA (US); Jean-Philippe Vasseur, Dunstable, MA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 11/048,077

(22) Filed: Feb. 1, 2005

(65) Prior Publication Data
US 2006/0171331 A1 Aug. 3, 2006

(51) Int. Cl.
*H04L 12/28* (2006.01)
*H04L 12/46* (2006.01)

(52) U.S. Cl. .................. 370/248; 370/252; 370/254; 370/351; 370/389

(58) Field of Classification Search .......... 370/248, 370/244, 250, 254, 240, 351, 392, 389, 401
See application file for complete search history.

(56) References Cited

U.S. PATENT DOCUMENTS

| | | | | |
|---|---|---|---|---|
| 6,259,679 | B1 * | 7/2001 | Henderson et al. | 370/254 |
| 6,970,464 | B2 | 11/2005 | Xu et al. | 370/392 |
| 7,072,304 | B2 * | 7/2006 | Ng et al. | 370/238 |
| 7,274,704 | B1 * | 9/2007 | Ould-Brahim et al. | 370/409 |
| 2002/0159393 | A1 | 10/2002 | Smith et al. | 370/249 |
| 2002/0165957 | A1 * | 11/2002 | Devoe et al. | 709/224 |
| 2004/0218542 | A1 * | 11/2004 | Lee | 370/248 |
| 2004/0223491 | A1 * | 11/2004 | Levy-Abegnoli et al. | 370/389 |

OTHER PUBLICATIONS

Rosen, E., et al., "BGP/MPLS VPNs", IETF RFC 2547, Mar. 1999.*
Bates, T., et al., "Multiprotocol Extensions for BGP-4", IETF RFC 2283, Feb. 1998.*
Rekhter, Y., and Li, T., "A Border Gateway Protocol 4 (BGP-4)", IETF RFC 1771, T. J. Watson Research Center, Cisco, Mar. 1995.*

* cited by examiner

*Primary Examiner*—Steven H. D Nguyen
*Assistant Examiner*—Cassandra Decker
(74) *Attorney, Agent, or Firm*—Brinks Hofer Gilson & Lione

(57) ABSTRACT

Customer edge (CE) to CE device verification checks initiate routes from available CEs as a set of path verification messages, destined for remote CE routes serving a remote VPN. An extended community attribute, included among the attributes of the path verification message, stores the identity of the originating CE router. The path verification message propagates across the network, and transports the identity of the originating CE router because the originator identity is not overwritten by successive routing. Upon receipt by the remote CE, the originator is determinable from the extended community attribute. A further reachability field is also included in the extended community attribute and indicates whether per CE or per prefix is appropriate for the particular route in question. In this manner, CE-CE connectivity checks identify CEs which are reachable from other CEs. Accordingly, such a mechanism allows for route reachability aggregation on a per-CE or per-prefix reachability basis.

16 Claims, 8 Drawing Sheets

SYSTEM AND METHODS FOR NETWORK PATH DETECTION

BACKGROUND

Computer networks typically provide a physical interconnection between different computers to allow convenient exchange of programs and data. A plurality of connectivity devices, such as switches and routers, interconnect each user computer connected to such a network. The connectivity devices maintain routing information about the computers and other connectivity devices, and perform routing decisions concerning message traffic passed between the computers via the connectivity devices. Each connectivity device, or router, corresponds to a network routing prefix (prefix) indicative of the other computers which it has direct or indirect access to. Therefore, data routed from one computer to another follows a path through the network defined by the routers between the two computers. In this manner, the aggregation of routers in the network define a graph of interconnections between the various computers connected to the network.

In a graphical representation, therefore, such a network may be conceived as a graph of nodes between computers. The graph defines one or more paths between each of the computers connected to the network. The routers, therefore, define nodes in a network, and data travels between the nodes in a series of so-called "hops" over the network. Since each router is typically connected to multiple other routers, there may be multiple potential paths between given computers. Typically, the routing information is employed in a routing table in each router which is used to determine a path to a destination computer or network. The router makes a routing decision, using the routing table, to identify the next "hop," or next router, to send the data to in order for it to ultimately reach the destination computer. However, network problems may arise which render routers and transmission paths between routers inoperable. Such failures effectively eliminate nodes or hops in the graph defined by the network, therefore interfering with data traffic which would have been routed over the affected paths.

In a typical conventional network, as indicated above, data takes the form of messages, which travel from among network devices, such as routers, in a series of hops from a source to the destination. In an exemplary network suitable for use with the methods and devices discussed herein, a Virtual Private Network (VPN) interconnects two or more local networks, such as LANs, by a VPN service operable to provide security to message traffic between the subnetworks, such that nodes of each sub-LAN can communicate with nodes of other sub-LANs as members of the same VPN. In a typical VPN arrangement, the particular subnetworks may be individual sites of a large business enterprise, such as a bank, retail, or large corporation, having multiple distinct sites each with a substantial subnetwork. A conventional VPN in such an environment is well suited to provide the transparent protection to communication between the subnetworks.

SUMMARY

Virtual Private Networks, or VPNs, therefore, have gained popularity as a mechanism for interconnecting remote sites of a related organization or enterprise. A VPN interconnects multiple subnetworks, or local area networks (LANs), of an enterprise such as a corporation, university, or distributor, for example. The subnetworks, in turn, interconnect with each other via a public access network such as the Internet. Such a subnetwork interconnection is typically known as a core network, and includes service providers having a high speed backbone of routers and trunk lines. Each of the subnetworks and the core networks has entry points known as edge routers, through which traffic ingressing and egressing from the networks flows. The core network has ingress/egress points handled by nodes known as provider edge (PE) routers, while the subnetworks have ingress/egress points known as customer edge (CE) routers. The edge routers often employ a specialized protocol particularly operable for serving network to network interconnections—i.e. edge router connections. One such protocol is the Border Gateway Protocol.

The Border Gateway Protocol (BGP) is an interautonomous system routing protocol. An autonomous system is a network or group of networks under a common administration and with common routing policies. BGP is used to exchange routing information for the Internet and is the protocol used between Internet service providers (ISP). Customer networks, such as universities and corporations, usually employ an Interior Gateway Protocol (IGP) such as RIP or OSPF for the exchange of routing information within their networks. Customers connect to ISPs, and ISPs use BGP to exchange customer and ISP routes. When BGP is used between autonomous systems (AS), the protocol is referred to as External BGP (EBGP). If a service provider is using BGP to exchange routes within an AS, then the protocol is referred to as Interior BGP (IBGP). The distinction of whether IGB or BGP is employed between the PE and CE depends upon the mechanism established to advertise routes from the CE to the PE, which is typically a matter of system configuration, which may depend, for example on throughput, connectivity (# of nodes), and the type of traffic (i.e. edge nodes to user subnets or trunk lines) to name several factors.

BGP, therefore, is a substantially robust and scalable routing protocol, as demonstrated by designation as the primary routing protocol employed on the Internet. By one estimation, Internet BGP routing tables number on the order of 100 K routes. To achieve scalability at this level, BGP uses many route parameters, called attributes, to define routing policies and maintain a stable routing environment.

BGP neighbors (adjacent nodes) exchange full routing information when the TCP connection between neighbors is first established. When changes to the routing table are detected, the BGP routers send to their neighbors only those routes that have changed. BGP routers do not send periodic routing updates, and BGP routing updates advertise only the optimal path to a destination network. Therefore, routes, or network paths, learned via BGP have associated properties that are used to determine the best route to a destination when multiple paths exist to a particular destination. These properties are referred to as BGP attributes, which may be employed to influence route selection. Such attributes include, for example, weight, local preference, multi-exit discriminator, origin, AS_path, next hop and community.

In a typical VPN, each subnetwork has one or more gateway nodes, or customer equipment (CE) routers, through which traffic egressing and ingressing to and from other subnetworks passes. The gateway nodes connect to a network provider router, or provider equipment (PE), at the edge of a core network operable to provide transport to the other subnetworks in the VPN. The CE and PE routers are sometimes referred to as "edge" routers due to their proximity on the edge of a customer or provider network. The core network, which may be a public access network such as the Internet, a physically separate intranet, or other interconnection, provides transport to a remote PE router. The remote PE router couples to a remote CE router representing the ingress to a remote subnetwork, or LAN, which is part of the VPN. The remote CE router performs forwarding of the message traffic on to the destination within the remote VPN (LAN) subnetwork.

In such a VPN arrangement, a particular end-to-end path between a VPN source, or originator, and a VPN destination, or recipient represents a plurality of segments. Each segment is a set of one or more hops between certain nodes along the path. A plurality of segments represents a path, and include the local CE segment from the local CE router to the core network, the core segment between the PE routers of the core network, and the remote CE segment from the remote PE router to the remote CE router, as will be discussed further below. Other segments may be defined. Accordingly, CE to CE path verification as discussed herein refers to the connection between VPN subnets via the core network.

In a conventional network, changes to available nodes (routes) are updated and propagated in response to node availability, transmission line disruptions, and other operational anomalies. Accordingly, conventional routing logic may periodically analyze available routes and reroute around identifiable problems. One particular approach to analyzing routes in the core network employs a convergence threshold. Typical routing information propagates among adjacent routers as updates to a routing table. The routing table identifies known routes, and eliminates or tags invalid or disrupted paths over time. The convergence threshold is indicative of an interval of time in which routing table propagation will reroute around a suspected bad route. Accordingly, CE to CE routes through the core network may be addressed by waiting for the convergence timer threshold, and retry to determine if a particular route still works. If so, then it has been rerouted in the core. However, such an approach requires a delay for the convergence threshold to expire. It may be beneficial to identify troubled CEs immediately, such as by each routing message identify the originating CE. As indicated above, routing updates employ attributes used to identify optimal routes. By attaching an originator-extended community attribute to the routing message (i.e. PVP message), the originating CE is identifiable.

One conventional implementation waits a predetermined interval of time represented by the convergence threshold for a convergence to occur, and then retries. In a core network problem, a so called convergence event may handled by rerouting within the core network. A particular approach to handling such a convergence is discussed in copending U.S. patent application entitled "SYSTEM AND METHODS FOR DETECTING NETWORK FAILURE," filed Dec. 1, 2004, Ser. No. 11/001,149, incorporated herein by reference. However, the convergence time may vary depending on factors such as the network configuration, distance traveled in the core network between the PE routers, and overall traffic volume. Accordingly, it would be beneficial to identify available routing paths through the core network, from an originating CE to a destination CE or destination prefix, rather than remaining blocked for a possibly excessive or worst-case convergence threshold. Alternatively, it may be beneficial to deterministically compute a time threshold during which a convergence event may occur, and resume diagnostic probing for alternate routes immediately after the computer convergence completion interval.

In a certain connectivity validation framework, such as that disclosed in the copending U.S. patent application cited above, CE to CE verification checks may be hindered because data-plane connectivity checks occur for specific prefixes which are reachable via one or more CEs. In this context the CE originator may not be known by the sending CE, nor is it necessary for such knowledge to be given to the CE. However, it may be beneficial to extend the framework to include a requirement where any given CE should be able to know what is the remote CE originator of any given route. The purpose for this extension is so that CE-CE verification checks can occur and therefore provide aggregation of multiple destinations which are reachable via such CEs.

Accordingly, conventional CE to CE route propagation suffers from the deficiency that successive PEs receiving the propagated route overwrite the next hop in the received route publication (message). In other words, each successive PE receiving the route overwrites the previous next hop attribute, thus obliterating information about the originating CE router. Therefore, when a destination CE receives the propagation report, or message, no information about the originating CE is obtainable because of the intervening PE routers.

A particular shortcoming of conventional routers is particularly evident in devices supporting Internet RFC 2547bis, concerning Virtual Private Networks (VPNs). In certain implementation, in processing routes received by a PE from a CE, have their next-hop attribute re-written by the PE. Moreover, when the route is propagated throughout the MPLS-VPN backbone, it is then advertised to other CEs by one or more PEs that re-write again the next-hop attribute prior to advertisement of the route to CEs. Therefore the originator CE information is lost and CE-CE verification checks are impeded.

It would be beneficial for a CE, when receiving routes from a PE, to detect the identity of the remote CE that originated the route. The configuration disclosed below outlines a particular arrangement for such a mechanism to work. Accordingly, configurations discussed herein substantially overcome the shortcoming presented by route detection mechanisms as discussed above by providing for CE-CE verification checks to occur and therefore enable aggregation of multiple destinations which are reachable via such CEs. Further, verification checks are performable on a CE to CE basis and on a CE to prefix (i.e. further router node within the VPN subnet) basis. CE to CE path verification is useful because it provides an indication of which edge nodes from a VPN subnet can reach which edge nodes serving a remote VPN (i.e. for making routing decisions), while CE to prefix path verification may be employed for circumstances where only a subset of certain prefixes are reachable from a CE. Also, a verified prefix route implicitly enables the CE-CE route through which it passes.

Configurations discussed herein provide for such CE to CE device (router) verification checks to occur by initiating routes from available CEs as a set of path verification messages, destined for remote CE routes serving a remote subnet, or VPN. An extended community attribute, included among the attributes of the path verification message, stores the identity of the originating CE router. The path verification message propagates across the network to the remote CE routers, and transports the identity of the originating CE router because the originator identity is not overwritten by successive routing "hops." Upon receipt by the remote CE, the originating CE is determinable from the extended community attribute. A further reachability field is also included in the extended community attribute and indicates whether per CE or per prefix is appropriate for the particular route in question. If per CE reachability is requested, then the receiving CE associates the originating CE with verified CE-CE path from the information in the extended community attribute. In this manner, CE-CE connectivity checks identify CEs which are reachable from other CEs, allowing rerouting decisions to be made selectively based on which CEs can "see" a particular remote CE. Accordingly, such a mechanism allows for route reachability aggregation on a per-CE basis while still allowing for per-prefix reachability, which may required for some important routes such a LNS server.

In particular arrangements, the method identifies, based on the location and nature of the network failure, network points at which to alter traffic to reroute traffic around failures. Such points are intermediate network nodes, and identifying the intermediate nodes further corresponds to identifying a network prefix corresponding to a network hop between a test initiator and a destination.

In further detail, the method of identifying network paths as disclosed herein includes building a path verification message operable for transmission from an originator to a destination, and storing the identity of the originator in the path verification message, in which the message is stored in a nonvolatile manner undisturbed by successive routing operations. The originating router (node) transmits the path verification message to the destination via at least one intermediate switching device, and receiving, if the transmitting was successful, the path verification message at the destination. The recipient router recovers, from the received path verification message, the identity of the transmitting originator by recovering the stored identity for identifying and/or mapping valid and invalid routing paths between CEs through the core network.

Therefore, the method allows designation of a path between the destination and the originator as a verified path based on the recovered identity of the originator, and identifying, if the transmitting to the destination was not successful, the originator as an invalid routing path to the destination. In a particular configuration discussed herein, the originator is a local customer edge (CE) router and the destination is a remote CE router, in which the originator and destination are interconnected by a path including at least one provider edge (PE) router. Such a PE router couples to a plurality of PE routers collectively defining a core network, in which the core network is operable to employ the path verification message for transmitting the identity of the originator to the destination.

In the exemplary configuration discussed further below, the path verification message further includes attributes operable to transport control information between the switching devices, and the attributes including an extended community field indicative of the originator of the path verification message. The path verification message further includes a reachability flag, the reachability flag indicative of a prefix based or CE based reachability check. Accordingly, the path verification messages include attributes according to a predetermined path verification protocol (PVP), in which storing the recipient identity further includes identifying a preserved attribute in the path verification transmission, and storing the address of the originator as the identity in the preserved attribute. The PVP also stores a reachability indicator indicative of prefix or path routes in the preserved attribute, and employs the preserved attributes for identifying the origination router of the routing message.

In the exemplary configuration, the devices are edge routers, including customer edge and provider edge, wherein the customer edge routers identify an ingress point to an autonomous system demarcated by a customer VPN boundary, and the provider edge routers identify an ingress point to a core network demarcating Internet service providers.

The path verification message is transported according to one of an intranetwork-border protocol (IGP) and an internetwork-border protocol (BGP), discussed further below. The protocol employed is determined to assign, if the internetwork-border protocol is employed, a reachability indicator to a loopback self-route, and to propagate the self-route to other switching devices via the intranetwork-border protocol. Further, the path verification message allows assigning, if the intranetwork-border protocol is employed, the originator indicator to successive path verification messages to other routing devices.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations discussed herein substantially overcome the shortcoming presented by threshold based route detection mechanisms as discussed above by providing for CE-CE verification checks to occur and therefore enable aggregation of multiple destinations which are reachable via such CEs. Further, verification checks are performable on a CE to CE basis and on a CE to prefix (i.e. further router node within the VPN subnet) basis. Such CE to CE device (router) verification checks therefore occur by initiating routes from available CEs as a set of path verification messages, destined for remote CE routes serving a remote subnet, or VPN. An extended community attribute, included among the attributes of the path verification message, stores the identity of the originating CE router. The path verification message propagates across the network to the remote CE routers, and transports the identity of the originating CE router because the originator identity is not overwritten by successive routing "hops." Upon receipt by the remote CE, the originating CE is determinable from the extended community attribute.

Further, a reachability field attribute is also included to indicate whether per CE or per prefix is appropriate for the particular route in question. If per CE reachability is requested, then the receiving CE associates the originating CE as a verified CE-CE path from the information in the extended community attribute. In this manner, CE-CE connectivity checks identify CEs which are reachable from other CEs, allowing rerouting decisions to be made selectively based on which CEs can "see" a particular remote CE. Accordingly, such a mechanism allows for route reachability aggregation on a per-CE basis while still allowing for per-prefix reachability, which may required for some important routes such a LNS server.

Figure 1:
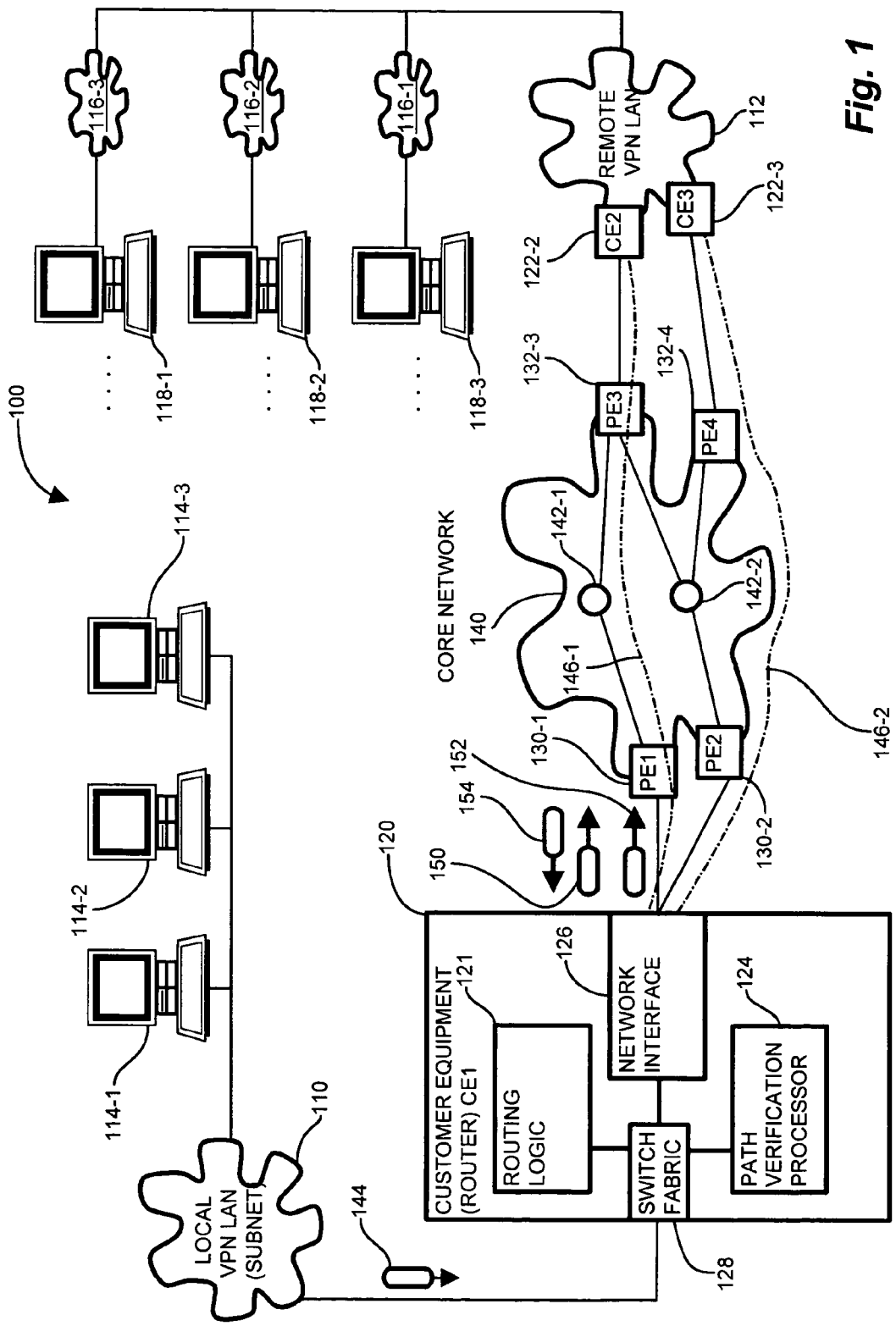
FIG. 1 is a context diagram of a network communications environment including network nodes defining paths via multiple provider equipment PE and customer equipment (CE) devices (routers) operable for use with the present invention.

FIG. 1 is a context diagram of a network communications environment 100 including network nodes defining paths via multiple provider equipment PE and customer equipment (CE) devices (routers) operable for use with the present invention. Referring to FIG. 1, the network communications environment 100 includes a local VPN LAN subnet 110 interconnecting a plurality of local users 114-1 . . . 114-3 (114 generally). As indicated above, a typical VPN includes a plurality of subnets, such as LANs, interconnected via a core network 140. For clarity of illustration, the discussion takes the perspective from one of the subnets as the local VPN LAN 110, coupled via the core network to other remote LAN 112 subnets, of which only a single LAN 112 is shown for clarity. Each of the local and remote nodes is operable as the local customer equipment (CE) router 120 shown in detail. Accordingly, the local LAN 110 connects to a gateway customer equipment CE router 120, which couples to one or more pieces of provider equipment devices 130-1 and 130-2 (130 generally). As will be discussed in further detail below, the CE router 120, being cognizant of the multiple PE routers 130-1 and 130-2, may perform routing decisions concerning whether to route traffic via routers 130-1 or 130-2, based upon considerations discussed herein, typically another router, at the edge of the core network 140. The CE router 120, or initial path verification device, includes routing logic 121 operable for typical control plane routing decisions, a path verification processor 124 operable to compute routing decisions as disclosed further below, and a network interface 126 for forwarding and receiving network traffic. The switching fabric 128 is responsive to the routing logic 122 for implementing the switching decisions via the physical ports on the device (not specifically shown). The core network 140 includes a plurality of core nodes 142-1 . . . 142-2 (142 generally), such as various routers, hubs, switches, and other connectivity devices, which interconnect other users served by the provider. A plurality of remote provider equipment devices 132-3 . . . 132-4 (132 generally) couples to one or more remote customer equipment routers 122-2 . . . 122-3 (122, generally) serving a remote VPN subnet, such as the VPN LAN 112. The remote VPN LAN 112, as its counterpart local subnet 110, servers a plurality of prefixes 116-1 . . . 116-3 (116 generally), which represent other routers or connectivity nodes serving a subset of users 118-1 . . . 118-N (118, generally).

The principles embodied in configurations of the discussed herein may be summarized by FIG. 1, and discussed in further detail below with respect to FIG. 3 and the flowchart in FIGS. 4-8. The local CE router 120 routes a packet sent from a user 114 on the local LAN 110 to one of the provider equipment routers 130, denoting entry into the core network 140. The PE routers 130-1 or 130-2 forward the packet toward its intended destination via a particular path 146-1 or 146-2, respectively, across the core network 140. For ease of illustration assume that PE1 forwards the packet 144 to node 142-1, for example, by invoking PE1 130-1 as the entry into the core network 140.

If a problem develops at node 142-1, for example, the path verification processor 124 on CE router 120 invokes the PE router 130 to identify the problem via a set of periodic diagnostic messages 150, and responses/acknowledgement 154 and the PE router 130 locates the problem via a set of path verification messages 152, both discussed further below. Accordingly, the path verification processor 124 on CE router 120 directs the routing logic 121 to route the user traffic packet 144 via the PE2 router 130-2. The path verification messages 152 are operable to identify complete paths through the core network from the local subnet 110 to the remote subnet 112 by identifying paths between the local and remote CE routers 120, 122 respectively. Further, the path verification messages 152 may also identify a path from the local CE router 120 to a remote prefix 116.

By retaining the identity of the originating local (CE) router 120, a remote CE router 122 or other connectivity node may identify a verified path between the local CE router 120 and a remote CE 122 or remote prefix router 116. In FIG. 1, the paths 146-1 and 146-2 represent paths between CE1-CE2 (120-122-2) and CE1-CE3 (120-122-3), respectively. In the example given above, in the event of failure of node 142-1, path 146-1 is interrupted. Accordingly, the path 146-1 between CE1 and CE2 is identifiable as inoperative, yet the path 146-2 between CE1 and CE3 remains verified. A less robust approach might merely indicate that some path exists between subnets 110 and 112. Here, such information may be employable, for example, such that CE1 employs PE2 130-2 as the next hop to subnet 112, or any of the prefixes 116, rather than relying on defunct node PE1 130-1.

Figure 2:
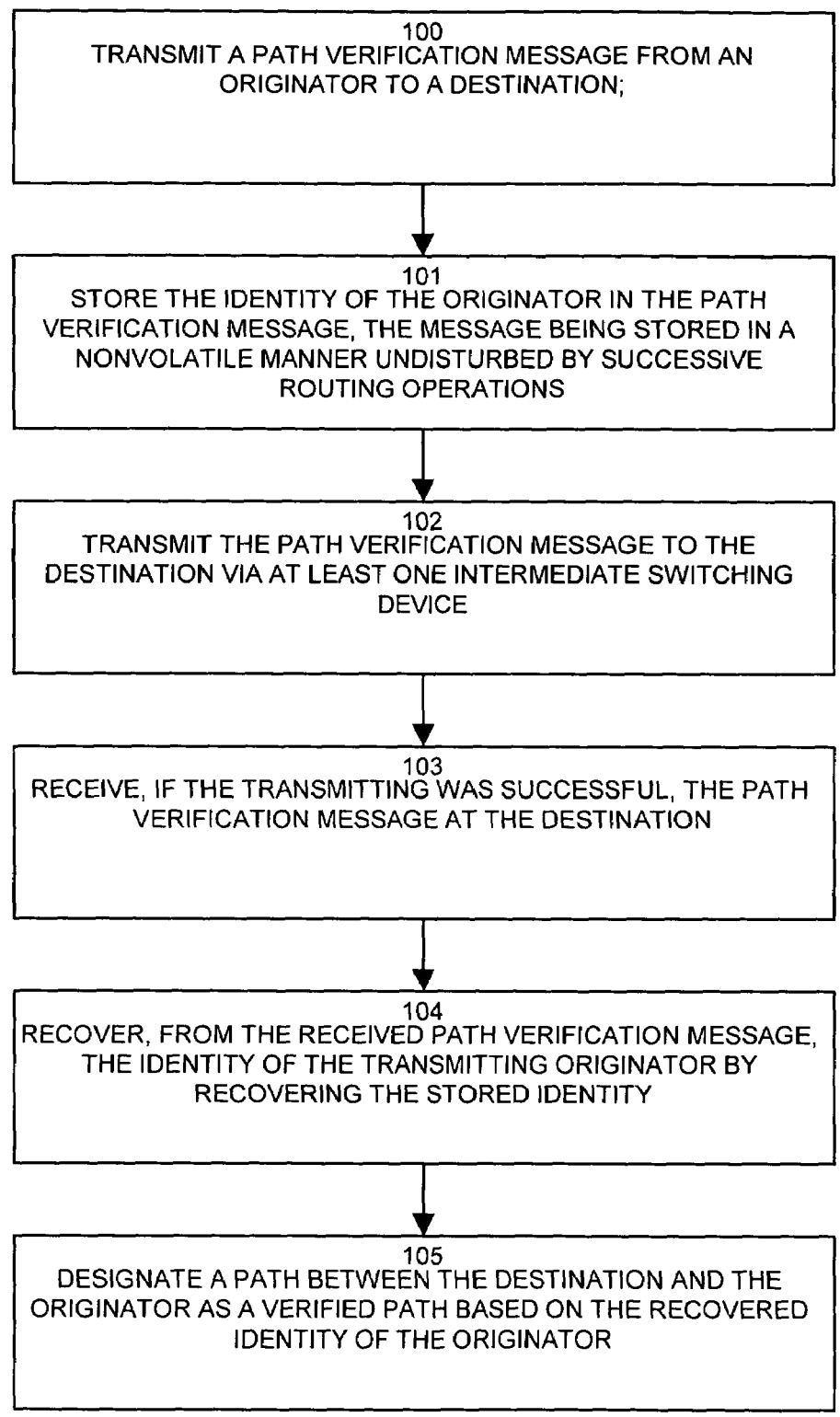
FIG. 2 is a flowchart of employing the CE to CE path verification mechanism in the network of FIG. 1.

FIG. 2 is a flowchart for employing the CE to CE path verification mechanism in the network of FIG. 1. Referring to FIGS. 1 and 2, the method of identifying network paths includes building a path verification message 152 operable for transmission from an originator 120 to a destination 122, as depicted at step 100, and storing the identity of the originator 120 in the path verification message 152, in which the message is stored in a nonvolatile manner undisturbed by successive routing operations, as depicted at step 101. The originator 120 is the CE router for a VPN subnet 110, and identification is the IP address or other unique identifier such as the MAC address. The originator CE router 120 transmits the path verification message to the destination via at least one intermediate switching device, such as core nodes (routers) 142, as depicted at step 102. The core network 140 interconnects a plurality of remote VPN subnets 112, and includes interconnected routing devices, such as PE routers 130, 132, intermediate routers 142, or other switching devices operable for message traffic transmission. In a typical implementation, the core network 140 is the Internet or other public access network.

The remote CE router 122 receives, if transmitting was successful, the path verification message 152 at the ingress point (either CE2 or CE3) into the remote VPN 112, as depicted at step 103. The recipient of the message may be either a CE router 122, at the edge (i.e. ingress point) to the VPN subnet 112, or a successive prefix 116 further into the subnet 112. The recipient recovers, from the received path verification message 152, the identity of the transmitting originator 120 by recovering the stored identity such as the IP address, as shown at step 104. Successful receipt allows designation of the path between the destination 122, 118 and the originator 120 as a verified path based on the recovered identity of the originator 120, as depicted at step 105. By retaining the identity of the originating CE 120, the validated path is therefore identifiable as a CE-CE (or CE-prefix, as the case may be) valid route.

Figure 3:
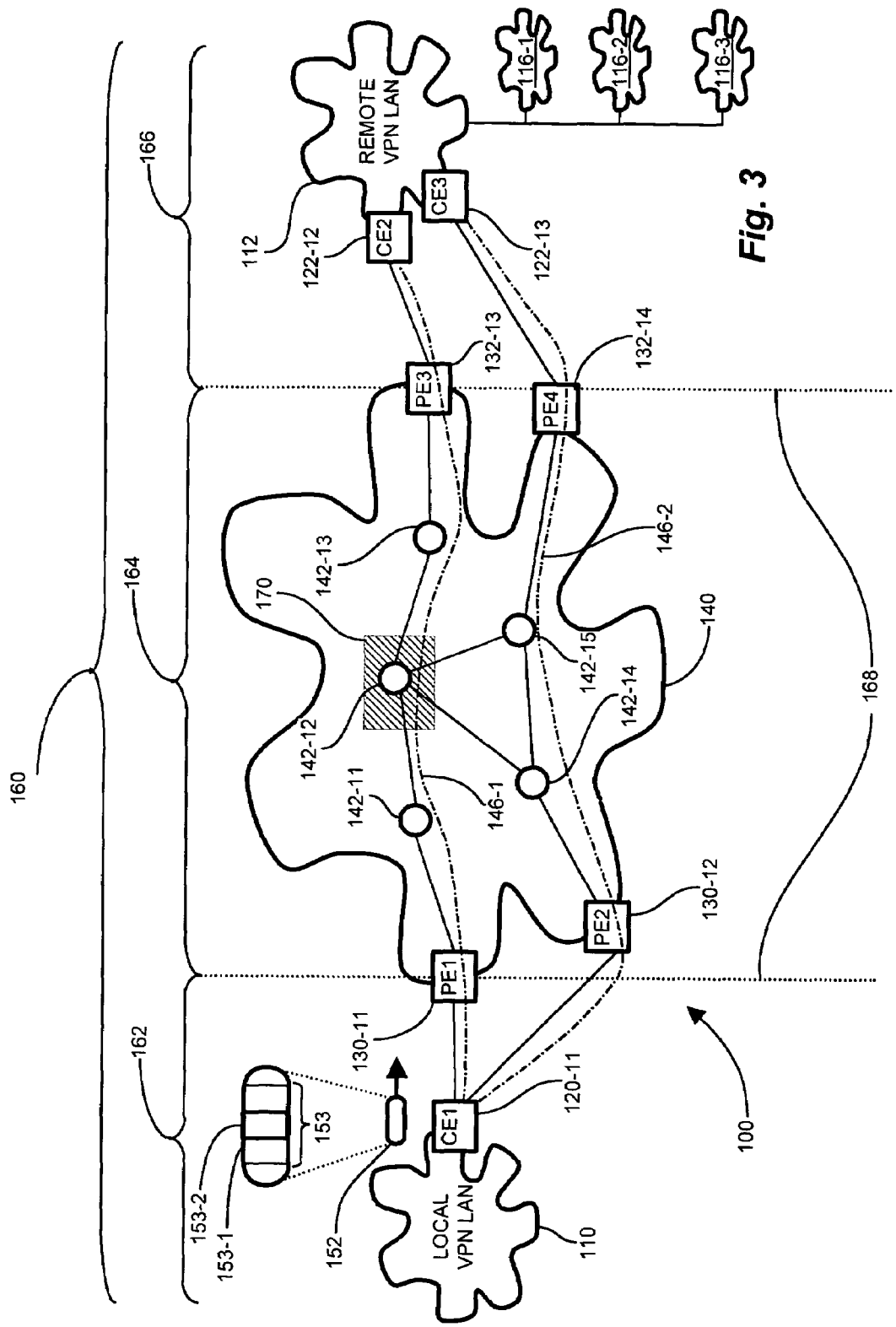
FIG. 3 is a block diagram illustrating validation of a CE-CE path in the exemplary network of FIG. 1.
Figure 4:
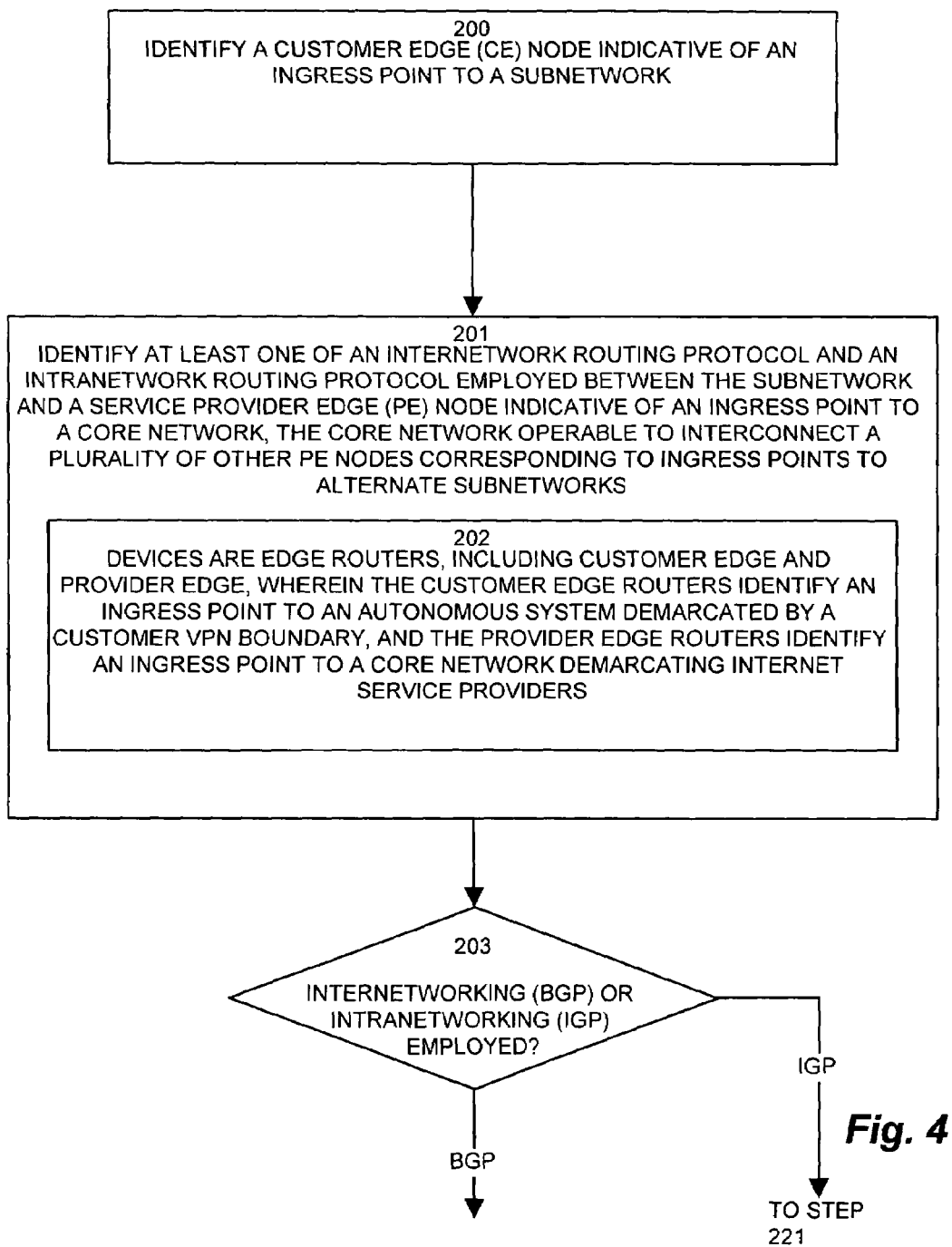
FIGS. 4-8 are a flowchart of the operation of the path verification mechanism for verifying the path in FIG. 3.
Figure 5:
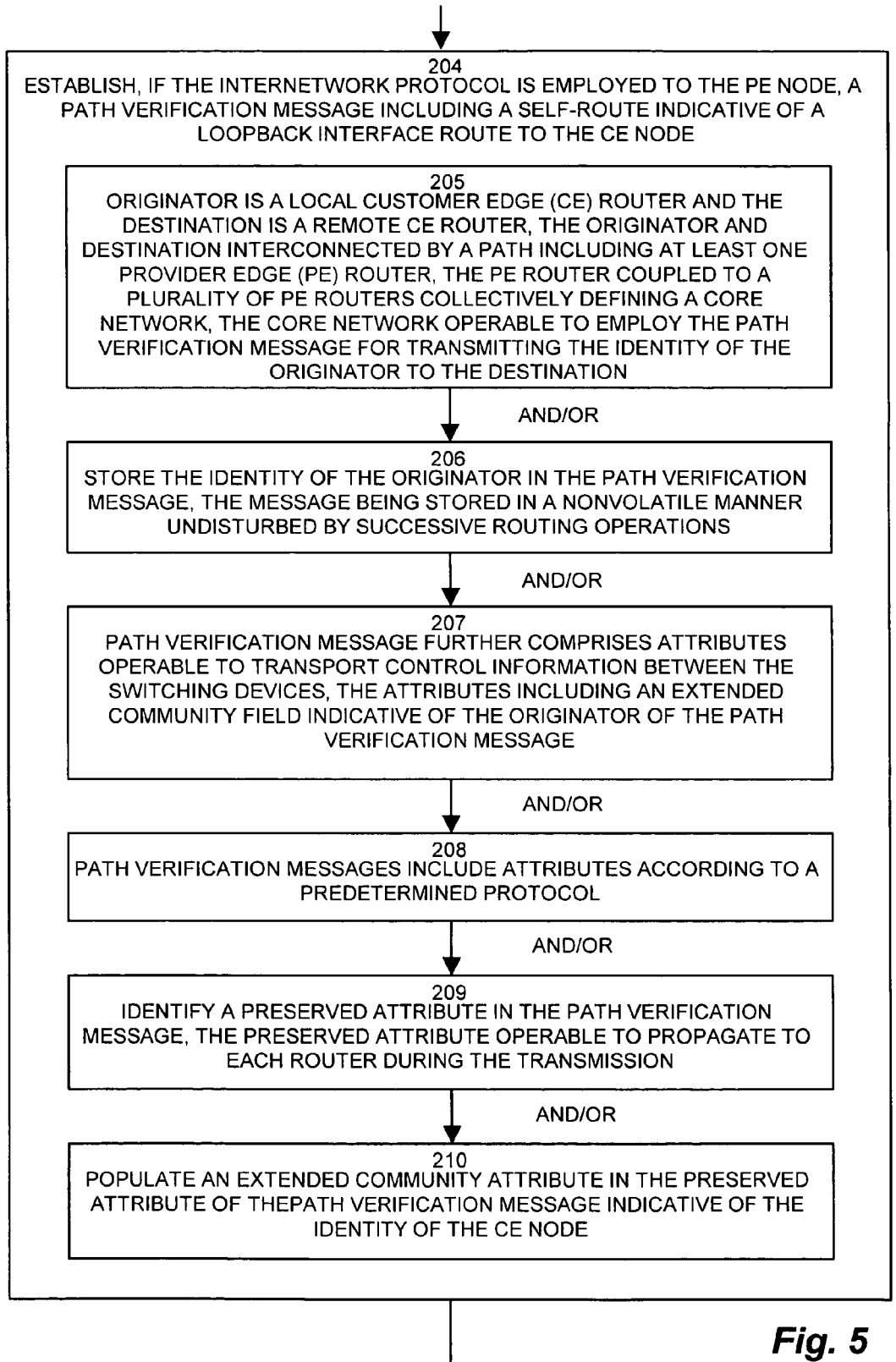
Figure 6:
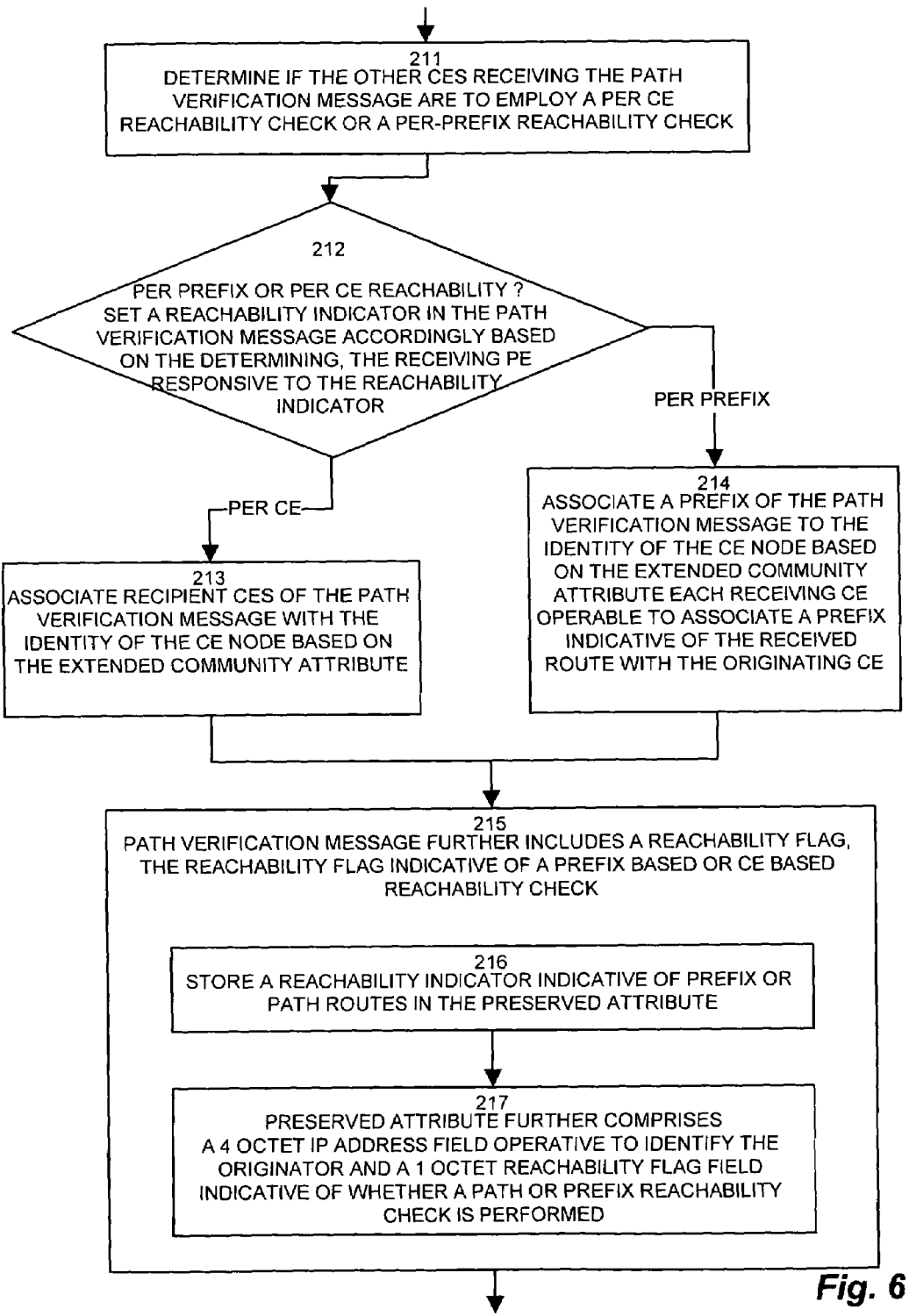
Figure 7:
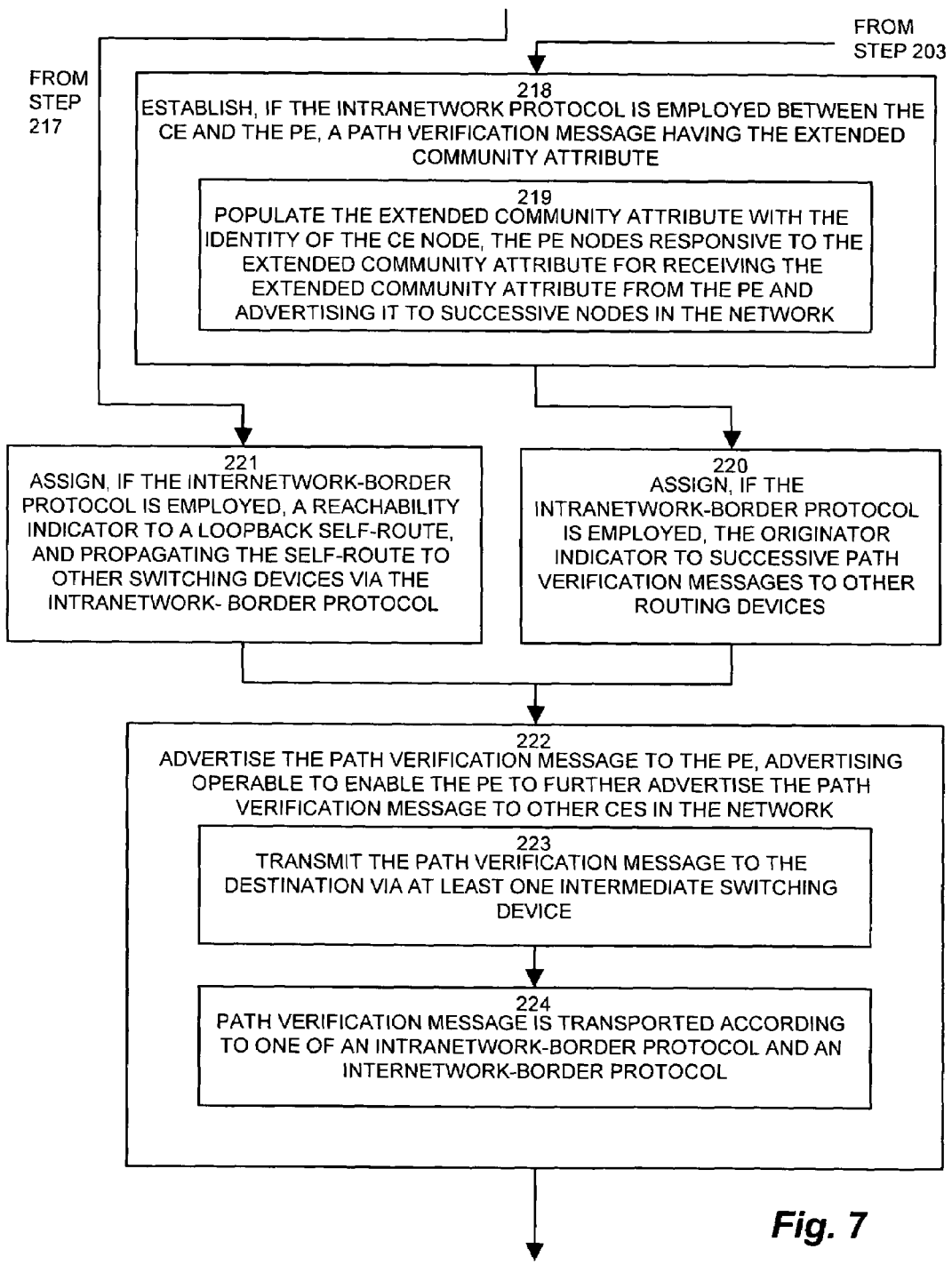
Figure 8:
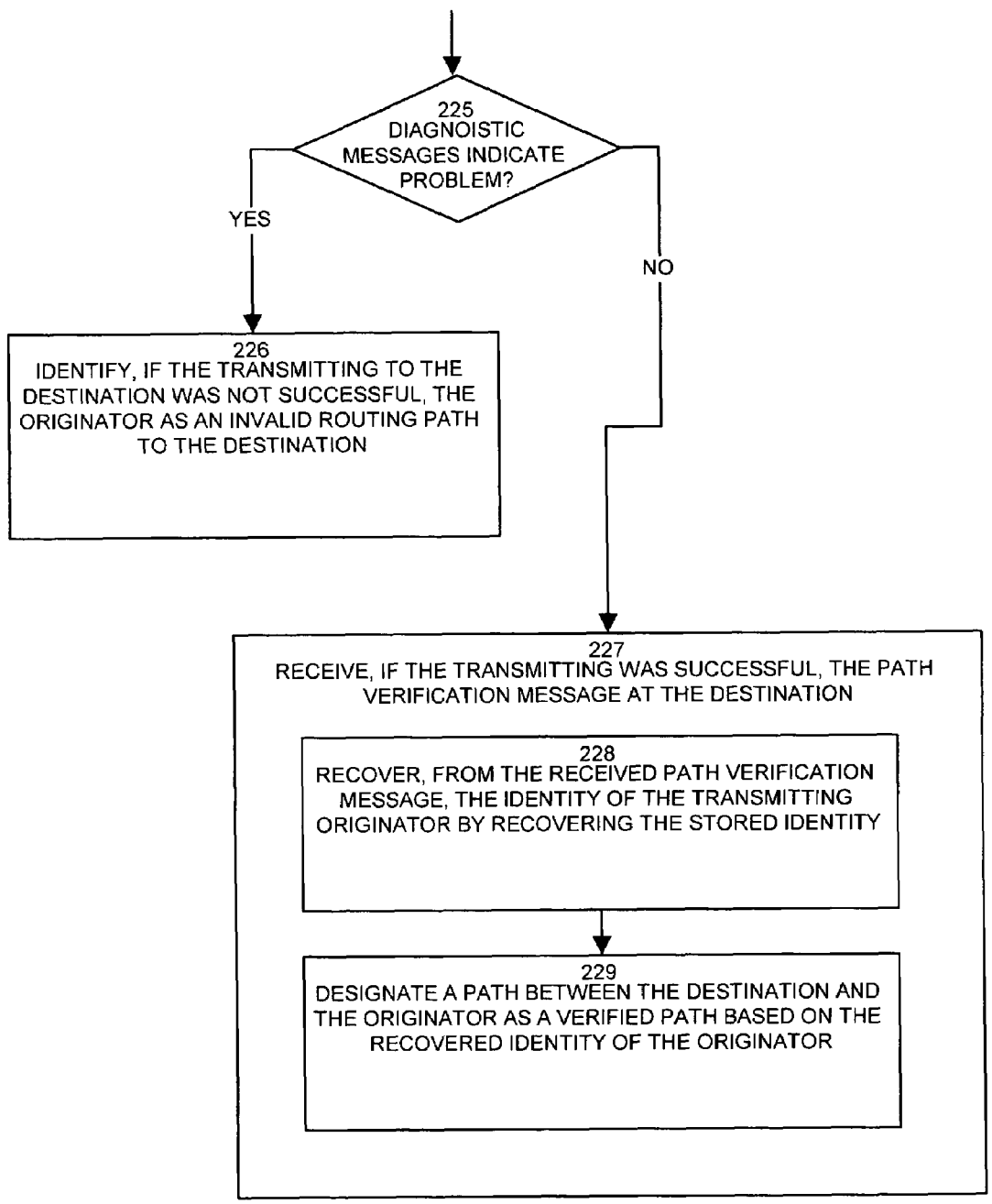

FIG. 3 is a block diagram illustrating validation of a CE-CE path in the exemplary network of FIG. 1. Referring to FIG. 3, the network environment 100 includes customer equipment 120-11, 122-12, 122-13, provider equipment 130-11, 130-12, 132-13, 132-14 and intermediate nodes 142-11 . . . 142-15 (142 generally). The paths through the network 100 can be subdivided into segments 160, demarcated by the customer equipment 120, 122 and provider equipment 130, 132 and shown by dotted lines 168. A local VPN segment 162 includes the path from the local VPN 110 to the provider equipment 130-11 and 130-12.

A core segment 164 includes the core network 140 to remote provider equipment devices 132-13, 132-14, and a remote VPN segment 166 covers the path from the remote PE routers 132 to the remote VPN 112. A further plurality of prefixes 116-1 . . . 116-3 are accessible from the remote VPN LAN subnet 112, which may for example be local LAN server nodes, discussed further below.

In the particular configuration shown in FIG. 3, the local segment 162 includes multiple PE routers 130-11, 130-12 for access into the core network 164. Further, these PE routers 130-11, 130-12 may connect to different nodes 142 in the core network 140, such as 142-11 and 142-14, respectively. Accordingly, a routing decision to employ a different provider equipment router 130 may effectively bypass a failure in the core network 140. Similarly, multiple CE routers 122 may serve a particular VPN prefix 116. Accordingly, path identification and verification on a per CE 122 and per prefix 116 basis allows intelligent routing decisions to be made based on available paths and traffic destination. In the example shown, the remote VPN LAN 112 couples to CE routers 122-12 and 122-13 (CE2 and CE3). Accordingly, if the path verification processor 124 on 132-11 (PE3) identifies a problem with either CE2 or CE3, it may employ the other CE router for access to the remote subnet 112 from the provider equipment 132.

In the core network of FIG. 3, a failure of node 142-12 affects the path CE1-CE2, as shown by shaded area 170. Rerouting by core nodes 142 is ineffective to reroute around such a failure. However, path CE1-CE3 146-2 remains available. Further, paths to specific prefixes CE1-116 remain available. It should be noted that prefix connectivity may vary in the subnet 112, such that certain prefixes 116 are available only from certain CEs 120, depending on the connectivity in the subnet 112. In such a scenario, per prefix path verification allows identification of paths to specific prefixes. For example, path CE1->116-1 may be available, while paths CE1->116-2 and CE1->116-3 may be unavailable. Therefore, if some routes (paths) are tagged to be verified on a per-prefix 116 basis, then the CE 122 may identify the set of prefixes 116 reachable via the same CE 122 for which a per-CE reachability check has been required (if any) and should use one of the prefixes 116 reachable via the CE 122 in question to report CE-reachability.

For example, suppose that two prefixes P1 and P2 are reachable via CEx for which a per-prefix reachability check has been requested and further suppose that a set of prefixes P3 . . . Pn are also reachable via CEx but for this set of prefixes for which a per-CE reachability check has been requested. In this case, the CE should not issue a CE reachability check for P3 . . . Pn but rather should piggyback the reachability result obtained for either P1 and P2 since all prefixes are reachable via the same remote PE. Such a mechanism advantageously allows for route reachability aggregation on a per-CE basis while still allowing for per-prefix reachability (required for some important routes such a LNS, server, and so forth).

FIGS. 4-8 are a flowchart of the operation of the path verification mechanism for verifying the path in FIG. 3. Referring to FIGS. 3-8, the method for identifying reliable routes between edge-node switching devices in a computer network further includes identifying a customer edge (CE) node 120-11 indicative of an ingress point to a subnetwork, as depicted at step 200. The edge node 120-11 is the point of egress from the VPN subnet 110 serving the customer site. As indicated above, several protocols may be available between the customer site VPN and the backbone or ISP network denoted by the PE router 130. The method therefore involves identifying at least one of an internetwork routing protocol and an intranetwork routing protocol employed between the subnetwork and a service provider edge (PE) node indicative of an ingress point to a core network, in which the core network operable to interconnect a plurality of other PE nodes corresponding to ingress points to alternate subnetworks, as disclosed at step 201. In other words, the transmission depends on whether an internetworking (BGP) or intranetworking (IGP) protocol is employed, as discussed above. The use of IGP vs. BGP may depend upon, for example, on throughput load, edge or trunk line connectivity, and the expected transmission speed through the node, as indicated above. Other factors may be employed as is known in the field of router protocols and internals.

In further detail, the devices employed between the customer subnet 110 and core network 140 are edge routers, including customer edge nodes 120, 122 and provider edge nodes 130, 132, wherein the customer edge routers identify an ingress point to an autonomous system demarcated by a customer VPN boundary, and the provider edge routers identify an ingress point to a core network demarcating internet service providers, as depicted at step 202. Accordingly, high performance and/or high throughput routing practices and protocols are to be expected.

A check is performed, as depicted at step 203, to determine the usage of IGP or BGP for transmission. If the internetwork protocol (BGP) is employed to the local PE node 130, then the originating CE node 120 establishes a path verification message 152 including a self-route indicative of a loopback interface route to the CE node, as depicted at step 204, as the first hop in transmitting a path verification message 152 from the originator 120 to a destination (remote CE) 120-12, 120-13. Accordingly, in the exemplary environment 100, the originator is a local customer edge (CE) router 120-1 and the destination is the remote CE router 122-12, 122-13, in which the originator and destination are interconnected by a path including at least one provider edge (PE) router 130. The PE router is typically coupled to a plurality of additional PE routers 130 collectively defining the core network 140, as disclosed at step 205, in which the core network 140 is operable to employ the path verification message 152 for transmitting the identity of the originator 120 to the destination 122.

The originator 120 stores the identity of the originator (itself) 120 in the path verification message 152, in which the message is stored in a nonvolatile manner undisturbed by successive routing operations, as disclosed at step 206. In order to provide a complete CE-CE routing verification check, the identity of the originator 120 is preserved in a field which is not overwritten or modified by successive routing hops along the core network 140. Therefore, according to the path verification protocol, the path verification message 152 further includes attributes 153 operable to transport control information between the switching devices 120, 130, in which the attributes include an extended community field 153-1 indicative of the originator 120 of the path verification message 152, as shown at step 207.

In further detail, therefore, the path verification messages 152 include attributes 153 according to a predetermined path verification protocol, as depicted at step 208. The attributes 153 are employed for storing CE identity by identifying a preserved attribute 153-1 in the path verification message 152, in which the preserved attribute 153-1 is operable to propagate to each router (i.e. node) 120, 130 during the transmission, as disclosed at step 209. The originating CE router 120, as part of the path verification protocol (PVP), stores the address of the originator 120 as the identity in the preserved attribute 153-1, as shown at step 210, therefore populating an extended community attribute in the path verification message indicative of the identity of the CE node.

Further, the originating CE 120 determines if the other CEs 120 receiving the path verification message 152 are to employ a per CE reachability check or a per-prefix reachability check, as depicted at step 211. As illustrated above with respect to FIG. 1, the CE-CE reachability check verifies the edge router 122 ingress point to the remote VPN LAN 112, while the per prefix verification attests to further nodes within the VPN LAN112 serving a subset of users 118 for a particular routing prefix (IP Address) 116. Accordingly, the originating CE router 120 determines if a per prefix 116 or per CE 122 reachability check is to be performed and sets a reachability indicator 153-2 in the path verification message 152 accordingly based on the determining, as shown at step 212.

The receiving PE 122 is responsive to the reachability indicator such that if the reachability indicator (flag) 153-2 is set to a per prefix check, the prefix of the path verification message is associated to the identity of the CE node based on the extended community attribute, in which each receiving CE 122 is operable to associate a prefix 116 indicative of the received route with the originating CE, as depicted at step 214. If the reachability flag 153-2 is set to a per-CE check, the recipient CEs 122 of the path verification message 152 are associated with the identity of the CE node 120 based on the extended community attribute 153-1, as shown at step 213.

Accordingly, the path verification message 152 further includes the reachability flag 153-2, in which the reachability flag 152-3 is indicative of a prefix 116 based or CE 122 based reachability check, as disclosed at step 215. The originating CE 120-11 stores the reachability indicator 153-2 indicative of prefix or path (per CE) routes in the preserved attribute 153, as depicted at step 216. In the exemplary configuration, the preserved attribute 153 further includes a four octet IP address field operative to identify the originator, and a one octet reachability flag field indicative of whether a path or prefix reachability check is performed, as shown at step 217.

Returning briefly to the protocol check at step 203, if the intranetwork (IGP) protocol is employed between the CE 120 and the PE, a path verification message 152 having the corresponding extended community attribute 152-1 is established, as depicted at step 218. The CE 120 establishes the corresponding extended community attribute 153-1 by populating the extended community attribute with the identity of the CE node 120, in which the PE node 130 is responsive to the extended community attribute 153-1 for receiving the extended community attribute 153-1 from the CE 120 and advertising it to successive nodes 142 in the network 140, as shown at step 219.

During successive routing hops, if the intranetwork-border protocol is employed, successive nodes (i.e. routers) assign the originator indicator (identity) to successive path verification messages to other routing devices, as depicted at step 220. Returning to step 221, if the internetwork-border protocol (BGP) is employed, the CE router 120 assigns the reachability indicator 153-2 to a loopback self-route, and propagates the self-route to other switching devices 142 via the intranetwork border protocol, as depicted at step 221.

Having established (generated) the path verification message 152, the originating CE 120 advertises (i.e. transmits) the path verification message 152 to the PE 122, in which such advertising is operable to enable the PE 122 to further advertise the path verification message to other CEs in the network, as disclosed at step 222, thus propagating the availability of the verified path. Propagation, therefore, includes transmitting the path verification message 152 to the destination 122 via at least one intermediate switching device, such as other nodes 142 or edge routers 130, 132, as discussed at step 223. As indicated above, the path verification message 152 may be transported according to one of an intranetwork-border protocol and an internetwork-border protocol, i.e. IGP or BGP, respectively, as depicted at step 224.

Following propagation from the originating CE node 120 to the destination CE node 122 or prefix 116, a check is performed at step 225 to determine if the diagnostic path verification message 152 indicates a problem. Other nodes may then identify, if the transmitting to the destination was not successful, the originator 120 as an invalid routing path to the destination 122, 116, as depicted at step 226. Since the originating CE node 120 is maintained in the extended community attribute 153-1, the originator-destination path is identifiable as verified or problematic upon an attempt to receive it at the destination 122, 116.

In contrast, the destination 122, 116 receives, if the transmitting was successful, the path verification message 153, as depicted at step 227. Such receipt indicates a verifiable CE-CE or CE-prefix routing path. The recipient 122 recovers, from the received path verification message 152, the identity of the transmitting originator 120 by recovering the stored identity from the extended community attribute 153-1, as shown at step 228. The successive propagation of valid routes may designate the path between the destination 122 and the originator 120 as a verified path based on the recovered identity of the originator 120, as depicted at step 229.

Those skilled in the art should readily appreciate that the programs and methods for identifying network failure as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for identifying network failure has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of identifying network paths comprising:
    building a path verification message for transmission from an originator to a destination;
    storing the identity of the originator in the path verification message, the message being stored in a nonvolatile manner undisturbed by successive routing operations, the path verification message including attributes according to a predetermined protocol, storing the identity of the originator further comprising:
        identifying a preserved attribute in the path verification message, the preserved attribute propagating to each of the intermediate switching devices during the transmission;
        storing an address of the originator as the identity in the preserved attribute;
        storing a reachability indicator indicative of prefix or path routes in the preserved attribute; and
        identifying an origination router of the path verification message;
    transmitting the path verification message to the destination via at least one intermediate switching device;
    receiving, if the transmitting was successful, the path verification message at the destination;
    recovering, from the received path verification message, the identity of the transmitting originator by recovering the stored identity; and
    designating a path between the destination and the originator as a verified path based on the recovered identity of the originator.

2. The method of claim 1 further comprising identifying, if the transmitting to the destination was not successful, the originator as an invalid routing path to the destination.

3. The method of claim 2 wherein the originator is a local customer edge (CE) router and the destination is a remote CE router, the originator and destination interconnected by a path including at least one provider edge (PE) router, the PE router coupled to a plurality of PE routers collectively defining a core network, the core network employing the path verification message for transmitting the identity of the originator to the destination.

4. The method of claim 3 wherein the path verification message further comprises attributes for transporting control information between the at least one intermediate switching devices, the attributes including an extended community field indicative of the originator of the path verification message.

5. The method of claim 4 further comprising storing, in the path verification message, a reachability flag, the reachability flag indicative of a prefix based or CE based reachability check.

6. The method of claim 1 wherein the at least one intermediate switching devices are edge routers, including customer edge routers and provider edge routers, wherein the customer edge routers identify an ingress point to an autonomous system demarcated by a customer VPN boundary, and the provider edge routers identify an ingress point to a core network demarcating a plurality of Internet service providers.

7. The method of claim 6 wherein the path verification message is transported according to one of an intranetwork-border protocol and an internetwork-border protocol, and:
    assigning, if the internetwork-border protocol is employed, a reachability indicator to a loopback self-route, and propagating the loopback self-route to the other switching devices via the intranetwork-border protocol; and
    assigning, if the intranetwork-border protocol is employed, an originator indicator to the successive path verification messages to the other switching devices.

8. The method of claim 7 wherein the preserved attribute further comprises:
    a 4 octet IP address field for identifying the originator; and
    a 1 octet reachability flag field indicative of whether a path or prefix reachability check is performed.

9. A method for identifying reliable routes between edge-node switching devices in a computer network comprising:
    identifying a customer edge (CE) node indicative of an ingress point to a subnetwork;
    identifying at least one of an internetwork routing protocol and an intranetwork routing protocol employed between the subnetwork and a service provider edge (PE) node indicative of an ingress point to a core network, the core network to interconnect a plurality of other PE nodes corresponding to ingress points to alternate subnetworks;
    establishing, if the internetwork protocol is employed to the PE node, a path verification message including a self-route indicative of a loopback interface route to the CE node, further comprising:
        populating an extended community attribute in the path verification message indicative of the identity of the CE node;
        advertising the path verification message to the PE node, the advertising enabling the PE node to further advertise the path verification message to other CE nodes in the network;
        determining if the other CE nodes receiving the path verification message are to employ a per CE node reachability check or a per-prefix reachability check; and
        setting a reachability indicator in the path verification message accordingly based on the determining, the receiving PE node responsive to the reachability indicator such that:
            if the reachability indicator is set to a per prefix reachability check, associating a prefix of the path verification message to the identity of the CE node based on the extended community attribute, each receiving CE node associating a prefix indicative of a received route with the originating CE node; and
            if the reachability indicator is set to a per-CE node reachability check, associating recipient CE nodes of the path verification message with the identity of the CE node based on the extended community attribute;
    establishing, if the internetwork protocol is employed between the CE node and the PE node, a path verification message having the extended community attribute, establishing further comprising:
        populating the extended community attribute with the identity of the CE node, the PE nodes responsive to the extended community attribute for receiving the extended community attribute from the CE node and advertising it to successive nodes in the network.

10. A data communications device comprising:
a path verification processor to build a path verification message for transmission from an originator to a destination;
at least one attribute in the path verification message for storing the identity of the originator in the path verification message, the identity indicative of an originating CE node, the message being stored in a nonvolatile manner undisturbed by successive routing operations, the path verification message including attributes according to a predetermined protocol, storing further comprising:
identifying a preserved attribute in the path verification message, the preserved attribute to propagate to each intermediate switching device during the transmission;
storing an address of the originator as the identity in the preserved attribute;
storing a reachability indicator indicative of prefix or oath routes in the preserved attribute; and
identifying the origination router of the routing message;
a network interface to transmit the path verification message to the destination via at least one intermediate switching device, the path verification message to be received, if the transmitting was successful, at the destination the destination recovering, from the received path verification message, the identity of the transmitting originator by recovering the stored identity; and
designating a path between the destination and the originator as a verified path based on the recovered identity of the originator.

11. The data communications device of claim 10 further comprising an alternate recipient node, the alternate recipient node identifying, if the transmitting to the destination was not successful, the originator as an invalid routing path to the destination.

12. The data communications device of claim 11 wherein the originator is a local customer edge (CE) router and the destination is a remote CE router, the originator and destination interconnected by a path including at least one provider edge (PE) router, the PE router coupled to a plurality of PE routers collectively defining a core network, the core network employing the path verification message for transmitting the identity of the originator to the destination.

13. The data communications device of claim 12 wherein the path verification message further comprises attributes to transport control information between the at least one intermediate switching device, the attributes including an extended community field indicative of the originator of the path verification message.

14. The data communications device of claim 13 wherein the path verification message further includes a reachability flag, the reachability flag indicative of a prefix based or CE based reachability check.

15. The data communications device of claim 10 wherein the at least one switching devices are edge routers, including customer edge routers and provider edge routers, wherein the customer edge routers identify an ingress point to an autonomous system demarcated by a customer VPN boundary, and the provider edge routers identify an ingress point to a core network demarcating a plurality of Internet service providers.

16. A computer program product having a computer readable storage medium storing computer program logic embodied in computer program code embedded with instructions thereon that, when executed by a processor, cause the computer to perform steps for identifying network paths comprising:
computer program code for building a path verification message for transmission from an originator to a destination;
computer program code for storing the identity of the originator in the path verification message, the message being stored in a nonvolatile manner undisturbed by successive routing operations;
computer program code for transmitting the path verification message to the destination via at least one intermediate switching device, the path verification message further including a reachability flag, the reachability flag indicative of a prefix based or CE based reachability check;
computer program code for receiving, if the transmitting was successful, the path verification message at the destination;
computer program code for recovering, from the received path verification message, the identity of the transmitting originator by recovering the stored identity;
computer program code for transporting the path verification message is according to one of an intranetwork-border protocol and an internetwork-border protocol;
computer program code for assigning, if the internetwork-border protocol is employed, a reachability indicator to a loopback self-route, and propagating the loopback self-route to the other switching devices via the intranetwork-border protocol; and
computer program code for assigning, if the intranetwork-border protocol is employed, an originator indicator to the successive path verification messages to the other switching devices.

* * * * *